United States Patent [19]
Hayashi

[11] Patent Number: 5,216,959
[45] Date of Patent: Jun. 8, 1993

[54] METHOD AND DEVICE FOR PRESS OVERLOAD PROTECTION

[75] Inventor: Tetsuji Hayashi, La Mirada, Calif.

[73] Assignee: Amada Company, Ltd., Japan

[21] Appl. No.: 756,596

[22] Filed: Sep. 10, 1991

[51] Int. Cl.[5] .............................................. B30B 15/28
[52] U.S. Cl. .......................................... 83/13; 83/543;
83/639.1; 91/468; 100/35; 100/53; 137/70;
192/130; 192/150
[58] Field of Search ................... 83/543, DIG. 1, 13,
83/639.1; 100/53, 35; 192/150, 130, 129 B;
91/468; 137/68.1, 70

[56] References Cited

U.S. PATENT DOCUMENTS

| | | | |
|---|---|---|---|
| 2,071,375 | 2/1937 | Allen | 137/70 |
| 2,620,815 | 12/1952 | Margraf et al. | 137/70 |
| 4,022,236 | 12/1977 | Dumont et al. | 137/70 |
| 4,030,336 | 6/1977 | Grigorenko et al. | 83/543 X |
| 4,096,798 | 6/1978 | Moskalik | 192/150 |
| 4,694,716 | 9/1987 | Sakamoto | 83/639.1 X |

FOREIGN PATENT DOCUMENTS 52-27393  7/1977  Japan.
1528181  10/1978  United Kingdom ............ 192/129 B Primary Examiner—Frank T. Yost
Assistant Examiner—Kenneth E. Peterson
Attorney, Agent, or Firm—Wigman, Cohen, Leitner & Myers

[57] ABSTRACT

A method and a device for protecting against a press overload is disclosed whereby, when an excessive pressure which exceeds a specified hydraulic pressure is transmitted to a pressure chamber of a press cylinder, this excessive pressure activates the punching of a shear plate by a shear piston and the excessive pressure is released by the shear piston.

3 Claims, 3 Drawing Sheets

METHOD AND DEVICE FOR PRESS OVERLOAD PROTECTION

BACKGROUND OF THE INVENTION

The present invention relates to a method and a device for protecting against a press overload to prevent damage to a press machine when the press machine receives an overload.

In a press machine such as a punch press or the like, when a striker strikes a punch to cause that punch to descend, if the punch is unable to descend, for example, as the result of a galling phenomenon of a punch and a die, an excessive load is produced. Conventionally, the following types of devices are known as press overload prevention devices for preventing damage to the punch or the striker or the like.

Specifically, for a mechanical press, Japanese Examined Patent Publication (KOKOKU) 52-27393 discloses a structure in which a shear plate is set directly in the striker so that, when an excessive load occurs, this shear plate is punched by the striker, and the punch is unable to perform the punching operation.

In addition, the following methods are known for use with hydraulic press, or a mechanical press with a cylinder built into the ram.

(A) A safety accumulator or a safety valve is provided on the pressurized side of the circuit.

(B) An emergency halt is applied to the impacting operation when the generation of excessive hydraulic pressure is detected on the pressurized side of the circuit.

(C) The above two methods are combined.

The method by which a shear plate is directly set in the striker is not suitable with respect to the structure of a hydraulic press. In addition, the method by which a safety accumulator or a safety valve is provided on the pressurized side of the circuit, or the method by which an emergency halt is applied to the impacting operation when the generation of excessive hydraulic pressure is detected on the pressurized side of the circuit, requires a rather large amount of time for the application of hydraulic pressure to the accumulator, the release of hydraulic pressure by the safety valve, or the application of the emergency halt to the impacting operation. Accordingly, the prevention of damage to the striker, punch or the like cannot always be said to be adequate. Furthermore, because these devices such as a safety valve or the like must operate when a high pressure occurs from excessive hydraulic pressure, they must have a large capacity and are therefore high-priced devices.

SUMMARY OF THE INVENTION

An object of the present invention is to provide, with due consideration to the drawbacks of such conventional devices, a method and a device for protecting against a press overload wherein the impacting operation is quickly halted when an excessively high pressure occurs, accomplished by a device with a simple configuration.

This object is achieved in the present invention by the provision of a method for protecting a press from an overload, comprising the steps of: punching a shear plate by means of a shear piston when the hydraulic pressure exceeds the specified pressure; and releasing the excessive pressure by the movement of the shear piston.

This object is further achieved in the present invention by the provision of an overload protection device for a press comprising a press cylinder provided on a striker with free vertical movement, for use with a punch and a die which operate in conjunction; a shear piston which receives pressure introduced to a pressure chamber of the press cylinder; a shear plate which is punched by the shear piston when the pressure exceeds a specified pressure; and a release section which releases the excess pressure introduced to the pressure chamber according to the position of the shear piston which has performed the punching operation.

When, for example, as the result of the phenomenon of galling of a punch and a die, the punch is unable to descend so that an excessively high load is produced, and a pressure in excess of the specified pressure is transmitted to the pressure chamber of a press cylinder, a shear piston punches a shear plate as a result of this excessive pressure, and the shear piston releases the excess pressure through this punch transfer operation. Accordingly, the excessive pressure produced in the pressure chamber of the press cylinder is released from the pressure chamber with almost no delay when the shear plate of the shear piston is punched, and damage to the punch or the like is satisfactorily prevented.

The excessive pressure produced in the pressure chamber is released through a release section which functions according to the position of the shear piston which has performed the punching action, so that the release structure for the excess pressure is extremely simple.

BRIEF DESCRIPTION OF THE DRAWINGS

These and other objects, features, and advantages of the present invention will become more apparent from the following description of the preferred embodiment taken in conjunction with the accompanying drawings, in which.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Figure 3:
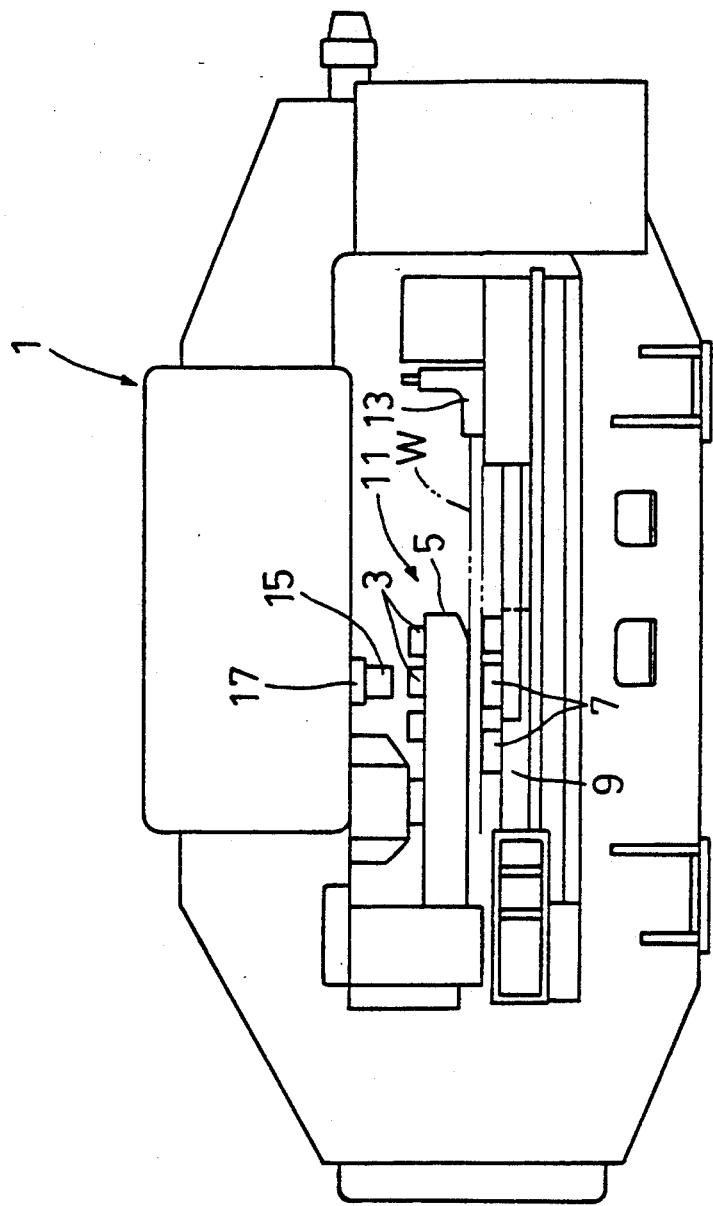
FIG. 3 is a front elevation showing an example of a punch press to which an embodiment of the present invention has been applied.

The present invention will now be explained with reference to the drawings with respect to an embodiment applied to a turret punch press. FIG. 3 is a front elevation of a conventional turret punch press 1 provided with a turret device 11 comprising a disk-shaped upper turret 5 provided with a plurality of punches 3, 3 . . . on its periphery, and a disk-shaped lower turret 9 provided with a plurality of dies 7, 7 . . . on its periphery, each die 7 being positioned to correspond with a punch 3. Between the punches 3, 3 . . . and the dies 7, 7 . . . , a workpiece W can be moved both longitudinally and laterally by a clamp device 13. A striker 15 is moved vertically through pressure transmitted to a press piston which has been omitted from the drawing. Each punch 3 can be moved vertically in this vertical operation, and the workpiece W is punched between the punch 3 and the die 7.

Figure 1:
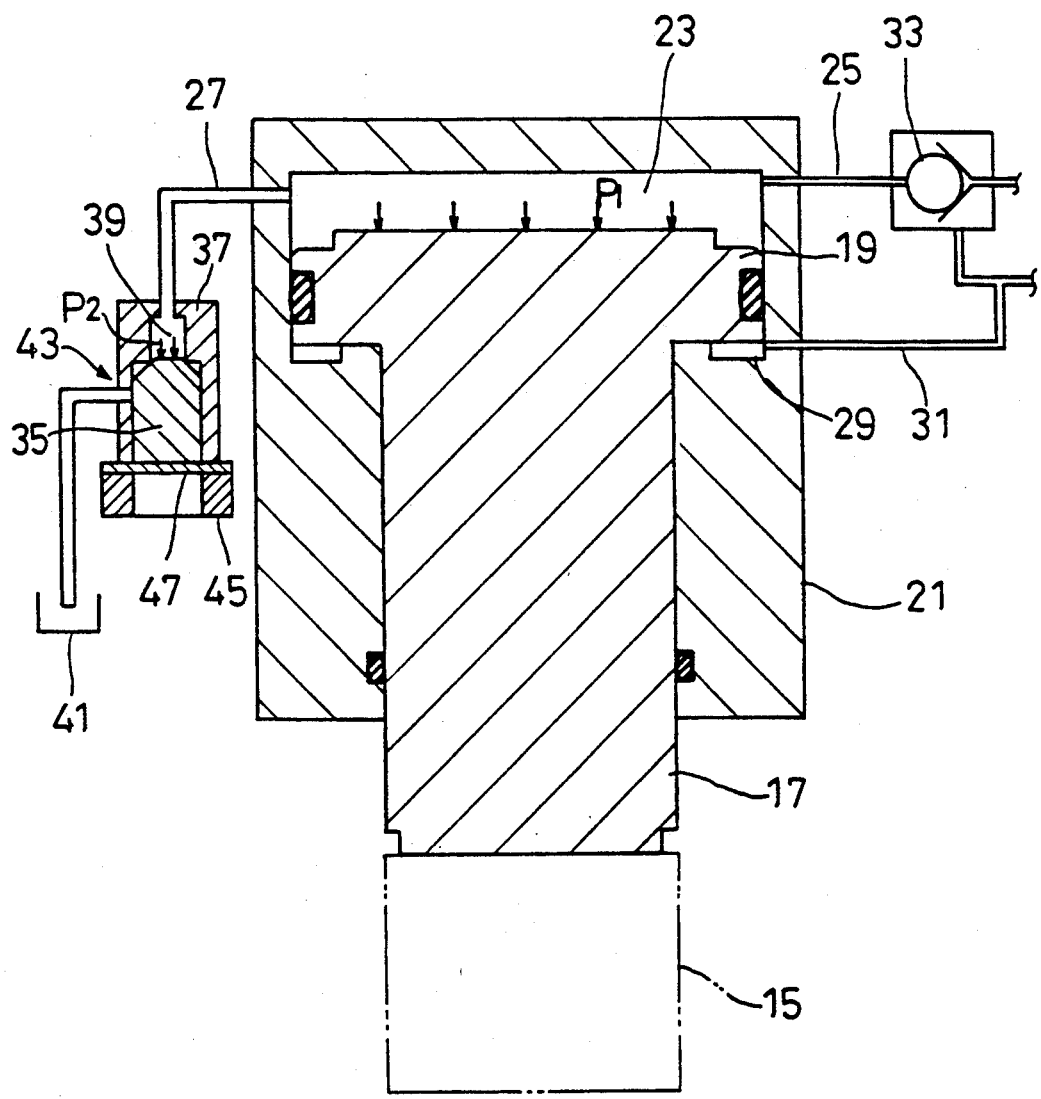
FIG. 1 is a vertical section of a front elevation showing an embodiment of an overload protection device of the present invention.

FIG. 1 is a vertical section of a front elevation showing the principal parts of the present invention. A striker 15 is linked to a press piston 17. A pressure section 19 of the press piston 17 is intimately inserted into a pressure chamber 23 of a press cylinder 21.

A fluid passage 25 and a exhaust passage 27 are connected to the pressure chamber 23, and a return passage 31 is connected to a return chamber 29 provided on the opposite side of the pressure chamber 23. The fluid passage 25 is connected to a fluid pressure supply device (omitted from the drawing) through a check valve 33. The return passage 31 is also connected to this fluid pressure supply device.

From this configuration, when pressure is transmitted to the pressure chamber 23 through the check valve 33, the press piston 17 descends together with the striker 15. When pressure from the return passage 31 is transmitted to the return chamber 29, the press piston 17 is elevated together with the striker 15.

The exhaust passage 27 is connected to a pressure chamber 39 of a shear cylinder 37 into which a shear piston 35 is intimately inserted. An exhaust section 43 which is an exhaust passage communicating with an exhaust tank 41 opens into the shear cylinder 37.

Figure 2:
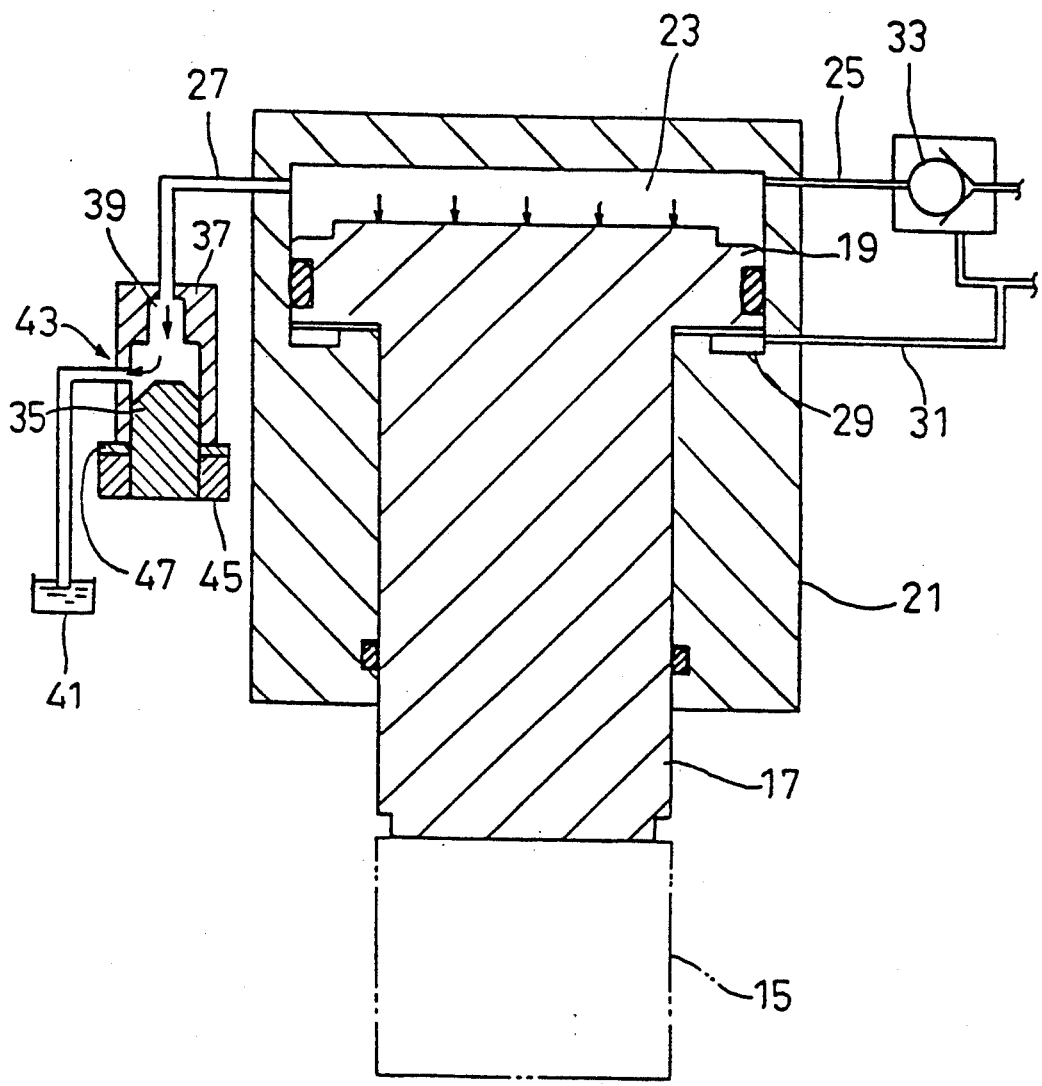
FIG. 2 is a vertical section of a front elevation showing an operating state of an overload protection device for a press.

The shear piston 35 is mounted on a shear plate 47 installed on a back-up die 45 which opposes the shear piston 35. In this state the exhaust section 43 is covered by the shear piston 35. When the pressure transmitted to the pressure chamber 23 becomes excessive, exceeding a specified pressure P1 (a normal hydraulic pressure during a specified punching operation by the punch and die), the shear plate 47 is punched by the shear piston 35, and the shear piston 35 moves as indicated in FIG. 2. The position of the exhaust section 43 is set so that the exhaust section 43 communicates with the pressure chamber 39 in this state.

If the cross sectional area of the pressure section 19 of the press piston 17 is taken as A1 and the cross sectional area inside the pressure chamber 39 of the shear piston 35 is taken as A2, when the specified pressure P1 is applied, a hydraulic pressure P2 applied to the shear piston 35 becomes equal to P1·A2/A1. If this value of A2/A1 is sufficiently small the punching action by the shear piston 35 is reliably carried out when an excessive pressure occurs. Specifically, the shear piston 35 should be formed with a diameter as small as possible with respect to the pressure section 19 of the press piston 17. The provision of a small diameter for the shear cylinder 37 and the shear piston 35 results in low fabrication costs.

Next, the operation of the device with the above-described configuration will be explained. When pressure from the fluid pressure supply device (omitted from the drawing) is transmitted to the pressure chamber 23 through the check valve 33, the press piston 17 descends together with the striker 15, and the workpiece W is punched, as specified, from the action of the punch 3 and the die 7. In addition, the pressure applied to the pressure chamber 23 is further transmitted to the pressure chamber 39 of the shear cylinder 37 from the exhaust passage 27. Because the pressure at this time does not exceed the specified pressure, the punching action by the shear piston 35 is not performed. Accordingly the exhaust section 43 remains blocked by the shear piston 35.

When the press piston 17 and the striker 15 descend together, and, for example, because of the galling phenomenon of the punch 3 and the die 7, the punch 3 cannot descend, an excessive pressure exceeding the specified pressure is produced in the pressure chamber 23. This excessive pressure is transmitted from the exhaust passage 27 to the shear cylinder 37, and the shear piston 35 moves to punch the shear plate 47. The exhaust section 43 then communicates with the pressure chamber 39 as shown in FIG. 2. When this occurs, the excessive pressure in the pressure chamber 23 is relieved through the pressure chamber 39 and the exhaust section 43 from the exhaust passage 27 and is quickly dissipated to the exhaust tank 41, thus reducing the excess pressure in the pressure chamber 23. As a result, when the galling phenomenon or the like is produced at the punch 3 and the die 7, the undesired descent of the press piston 17 and the striker 15 is halted and damage to the punch 3 or the like is avoided.

The above explanation was made for an embodiment of the present invention applied to a turret punch press. However, the present invention can also be applied equally well to a punch press or any press machines other than a turret punch press in the same manner.

Because the method and device of the present invention for protecting against a press overload has the above-described configuration, when, for example, as the result of the phenomenon of galling of a punch and a die, the punch is unable to descend so that an excessively high load is produced, and a pressure in excess of the specified pressure is transmitted to the pressure chamber of a press cylinder, a shear piston punches a shear plate as a result of this excessive pressure, and the shear piston releases the excess pressure through this punch transfer operation. Accordingly, the excessive pressure produced in the pressure chamber of the press cylinder is released from the pressure chamber with almost no delay when the shear plate of the shear piston is punched, and damage to the punch or the like is satisfactorily prevented.

The excessive pressure produced in the pressure chamber is released through a release section which functions according to the position of the shear piston which has performed the punching action, so that the release structure for the excess pressure is extremely simple.

What is claimed is:

1. An overload protection device for a press provided with a press cylinder having a pressure chamber housing a pressure-driven press piston, comprising:
   a shear cylinder having a pressure chamber connected to the pressure chamber of the press cylinder so that the shear cylinder receives pressure introduced to the pressure chamber of the press cylinder;
   a shear piston in the shear cylinder, the pressure being in substantially full-time communication with the press piston and the shear piston along the stroke of the press piston;
   a shear plate disposed under the shear cylinder in order to be punched by the shear piston when the pressure in the pressure chambers exceeds a specified value;
   a release section provided in the chamber of the shear cylinder, for releasing the excess pressure introduced to the chamber of the shear cylinder after the shear piston has punched the shear plate, wherein the release section is closed by the shear piston when the pressure is not excessive, and opens into the chamber of the shear cylinder when the shear piston moves for punching the shear plate; and an exhaust port in the release section against which the longitudinal periphery of the shear piston is held in sealing relationship when the pressure is not excessive, the exhaust port being in serial communication with the excess pressure when the shear piston has moved to punch the shear plate.

2. A method for protecting a press from a pressure overload resulting from an excessive pressure when a hydraulic working fluid introduced to a pressure chamber of a press cylinder housing a press piston driven by the hydraulic working fluid exceeds a specified pressure value, comprising the steps of:

punching a shear plate by applying the excessive pressure working fluid to a shear piston in a shear cylinder;

releasing the excessive pressure of the hydraulic working fluid into the shear cylinder to reduce the excess pressure in the pressure chamber of the press cylinder;

venting the hydraulic working fluid from the shear cylinder; and holding the longitudinal periphery of the shear piston in sealing relationship against a hydraulic fluid vent when the working fluid does not exceed a specified pressure value.

3. An overload protection device for a press provided with a press cylinder having a pressure chamber housing a pressure-driven press piston, comprising:

a shear cylinder having a pressure chamber in pressurized fluid communication with the pressure chamber of said press cylinder;

a shear piston in said shear cylinder being in substantially full-time fluid communication with the press piston along the stroke of the press piston;

a shear plate disposed in opposing relationship to said shear piston in order to be punched by said shear piston when the pressure exceeds a specified value to thereby relieve the excess pressure in the pressure chamber of said press cylinder;

a release section in fluid communication with said shear cylinder chamber for releasing the excess pressure after the shear piston has punched the shear plate; and an exhaust port in the release section against which the longitudinal periphery of the shear piston is held in sealing relationship when the fluid pressure is not excessive, the exhaust port being in fluid communication when the pressure has exceeded a specified pressure value.

* * * * *

UNITED STATES PATENT AND TRADEMARK OFFICE
CERTIFICATE OF CORRECTION

PATENT NO. : 5,216,959
DATED : June 8, 1993
INVENTOR(S) : Tetsuji Hayashi

It is certified that error appears in the above-indentified patent and that said Letters Patent is hereby corrected as shown below:

ON THE TITLE PAGE:

Correct the name of the assignee as follows:

[73] Assignee: Amada Mfg America, Inc., La Mirada, Calif.
Amada Company, Ltd., Kanagawa, Japan Signed and Sealed this Seventh Day of April, 1998

Attest:

BRUCE LEHMAN

*Attesting Officer*  *Commissioner of Patents and Trademarks*